US012666404B2

(12) United States Patent
Koike

(10) Patent No.: US 12,666,404 B2
(45) Date of Patent: Jun. 23, 2026

(54) COMMUNICATION APPARATUS WIRELESSLY COMMUNICATING WITH EXTERNAL APPARATUS, CONTROL METHOD, AND STORAGE MEDIUM

(71) Applicant: CANON KABUSHIKI KAISHA, Tokyo (JP)

(72) Inventor: Kohtaro Koike, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 876 days.

(21) Appl. No.: 17/740,162

(22) Filed: May 9, 2022

(65) Prior Publication Data

US 2022/0377734 A1 Nov. 24, 2022

(30) Foreign Application Priority Data

May 19, 2021 (JP) ................................. 2021-084668

(51) Int. Cl.
*H04W 72/0446* (2023.01)
*H04W 4/80* (2018.01)

(52) U.S. Cl.
CPC ......... *H04W 72/0446* (2013.01); *H04W 4/80* (2018.02)

(58) Field of Classification Search
CPC ............... H04W 72/0446; H04W 4/80; H04W 52/0229; H04W 52/028; Y02D 30/70
See application file for complete search history.

(56) References Cited

U.S. PATENT DOCUMENTS

| | | | | |
|---|---|---|---|---|
| 2015/0245298 A1* | 8/2015 | Takahashi | ......... | H04W 52/0261 455/574 |
| 2016/0037566 A1* | 2/2016 | Jakusovszky | ........... | H04W 4/80 455/41.2 |
| 2016/0100394 A1* | 4/2016 | Tachiwa | .................. | H04W 4/80 370/329 |
| 2022/0022132 A1* | 1/2022 | Knaappila | ........... | H04W 56/001 |

FOREIGN PATENT DOCUMENTS

| | | | | | |
|---|---|---|---|---|---|
| JP | 2016174348 A | * | 9/2016 | ........ | H04N 1/00103 |
| JP | 2017144627 A | * | 8/2017 | | |
| JP | 2018-121261 A | | 8/2018 | | |
| WO | WO-2021195947 A1 | * | 10/2021 | | |

* cited by examiner

*Primary Examiner* — Austin J Moreau

(74) *Attorney, Agent, or Firm* — Canon U.S.A., Inc., IP Division

(57) ABSTRACT

A communication apparatus includes a generation unit configured to generate data in a first state, a communication unit configured to wirelessly communicate with an external apparatus at a first time interval, a transmission unit configured to transmit data to the external apparatus in response to a transition to a second state in which power consumption is smaller than power consumption in the first state. When the control unit controls the transmission unit not to transmit the data in the second state, the communication unit wirelessly communicates, in the second state, at a second time interval, the second time interval being larger than the first time interval. When the control unit controls the transmission unit to transmit the data in the second state, the communication unit wirelessly communicates, in the second state, at a third time interval, the third time interval being smaller than the second time interval.

12 Claims, 12 Drawing Sheets

100

101

CONTROL UNIT

IMAGING UNIT — 102

NONVOLATILE MEMORY — 103

WORKING MEMORY — 104

DISPLAY UNIT — 106

OPERATION UNIT — 105

WIRELESS COMMUNICATION UNIT 111

NEAR FIELD COMMUNICATION UNIT 112

RECORDING MEDIUM

110

FIRST NEAR FIELD COMMUNICATION UNIT

112a

112b

SECOND NEAR FIELD COMMUNICATION UNIT 105a          100          105e

102

105e     105d     106     105a

105b

105c

COMMUNICATION APPARATUS WIRELESSLY COMMUNICATING WITH EXTERNAL APPARATUS, CONTROL METHOD, AND STORAGE MEDIUM

BACKGROUND

Field

The present disclosure relates to a communication apparatus wirelessly communicating with an external apparatus.

Description of the Related Art

In recent years, an electronic device such as a digital camera has included a communication function for connecting with an external apparatus including a smartphone. By using the communication function, a digital camera can transmit image data to a smartphone and can be remotely controlled from a smartphone.

Since a digital camera is typically driven by a battery, there is a demand for a digital camera to be in a power saving state when the digital camera is not being used by a user, such as when the camera is in a power-off state. However, to operate the digital camera with high responsivity from a smartphone, the digital camera and the smartphone are desirably connected wirelessly all the time. Thus, some digital cameras provide mechanisms for maintaining a wireless connection with an external apparatus while at the same time being in a state where the digital camera is suppressing power consumption, even in a state where the digital camera is being unused by a user, such as a power-off state.

Japanese Patent Application Laid-Open No. 2018-121261 discusses a technique with which a digital camera communicates with an external apparatus at a first time interval in a power-off state and a second time interval in a power-on state, the first time interval (that is used in the power-off state) being longer than the second time interval (that is used in the power-on state).

Expected use cases of transmitting image data from a digital camera to a smartphone include a use case where a digital camera automatically transmits image data to a smartphone while the digital camera is in a power-off state, the power-off state being one where the digital camera is not being used by the user. In such a use case, when the user wants to check, via the smartphone, the image data captured by the digital camera, the user will typically desire the digital camera to start transmitting image data to the smartphone as soon as possible.

Nevertheless, in a case where a time interval of wireless communication is prolonged in response to a camera's power being turned off, for example, the transmission start of image data may be drastically delayed as compared with a case where a time interval of wireless communication is not prolonged, as discussed in Japanese Patent Application Laid-Open No. 2018-121261.

SUMMARY

According to various embodiments of the present disclosure, a communication apparatus includes a generation unit configured to generate data in a first state, a communication unit configured to wirelessly communicate with an external apparatus at a first time interval, a transmission unit configured to transmit data generated by the generation unit to the external apparatus in response to a transition to a second state in which power consumption is smaller than power consumption in the first state, and a control unit configured to control whether the transmission unit transmits the data in the second state. In a case where the control unit controls the transmission unit not to transmit the data in the second state, the communication unit wirelessly communicates, in the second state, with the external apparatus at a second time interval, the second time interval being larger than the first time interval. In a case where the control unit controls the transmission unit to transmit the data in the second state, the communication unit wirelessly communicates, in the second state, with the external apparatus at a third time interval, the third time interval being smaller than the second time interval.

Further features of the present disclosure will become apparent from the following description of example embodiments with reference to the attached drawings.

DESCRIPTION OF THE EMBODIMENTS

Hereinafter, various example embodiments of the present disclosure will be described in detail with reference to the attached drawings.

<Configuration of Camera>

Figures 1A, 1B, 1C:
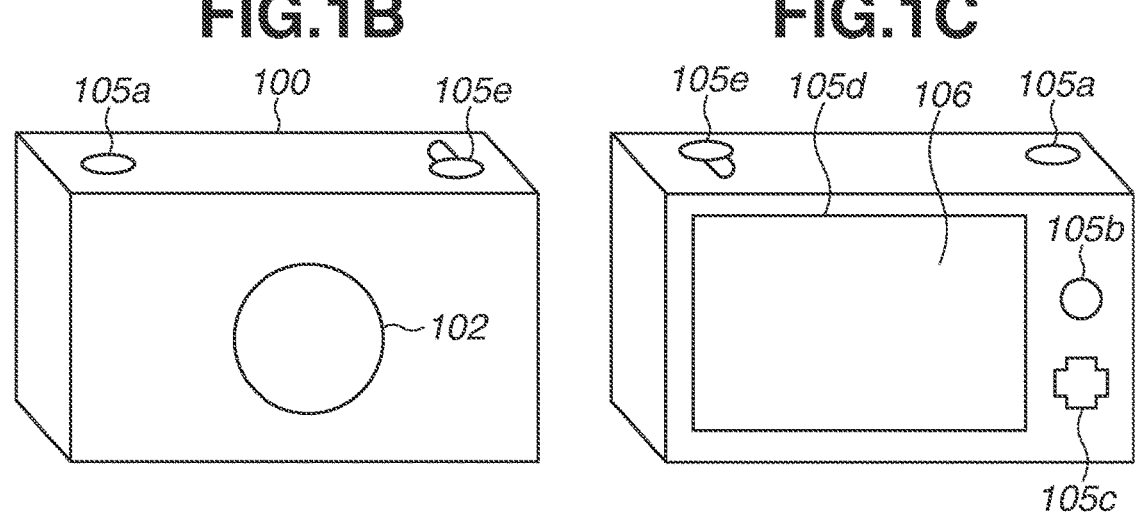
FIG. 1A is a block diagram of a camera according to first and second example embodiments.
FIGS. 1B and 1C are external views of the camera according to the first and second example embodiments.

FIG. 1A is a block diagram illustrating a configuration example of a camera 100 serving as an example of a communication apparatus according to a first example embodiment. While a digital camera will be described as an example of the communication apparatus, the communication apparatus is not limited to this. For example, the communication apparatus may be an information processing apparatus, such as a smartphone, a portable media player, a so-called tablet device, or a personal computer.

A control unit 101 includes a processor for controlling each component of the camera 100 in accordance with input signals or programs described below. Instead of the control unit 101 controlling the entire apparatus, a plurality of pieces of hardware may control the entire apparatus while sharing processing.

An imaging unit 102 includes, for example, a lens unit, an image sensor for converting an optical image of a subject that is formed on an imaging plane through the lens unit, into an electrical signal, and an image processing unit that generates still image data or moving image data from the electrical signal generated by the image sensor. As the image sensor, a complementary metal oxide semiconductor (CMOS) image sensor or a charge coupled device (CCD) image sensor is typically used. In the first example embodiment and other example embodiments, a series of processes of generating still image data or moving image data with the imaging unit 102, and outputting the generated image data from the imaging unit 102 will be referred to as "image capturing". The still image data or moving image data generated by the imaging unit 102 is recorded onto a recording medium 110 in accordance with a design rule for camera file system (DCF) standard. A nonvolatile memory 103 is an electrically erasable programmable nonvolatile memory, and stores programs to be described below and to be executed by the control unit 101.

A working memory 104 is used as a buffer memory for temporarily storing data of images captured by the imaging unit 102, a memory for displaying images on a display unit 106, or a work area of the control unit 101.

An operation unit 105 is used for receiving, from a user, an instruction issued by the user to the camera 100. The operation unit 105 includes, for example, a power button for the user issuing a power ON/OFF instruction to the camera 100, a release button for issuing an imaging instruction, and a reproduction button for issuing a reproduction instruction of image data. The operation unit 105 further includes an operation member, such as a dedicated connection button for starting communication with an external apparatus via a wireless communication unit 111 described below. The operation unit 105 also includes a touch panel formed on the display unit 106 described below. The release button includes switches 1 and 2. When the release button enters a so-called half-pressed state, the switch 1 is turned ON. An instruction for making imaging preparations, such as autofocus (AF) processing, autoexposure (AE) processing, automatic white balance (AWB) processing, and electronic flash pre-emission (EF), is thereby received. When the release button enters a so-called fully-pressed state, the switch 2 is turned ON. An instruction for performing image capturing is thereby received.

The display unit 106 displays a viewfinder image in image capturing, data of a captured image, and characters for interactive operations. The display unit 106 also performs lighting/blinking/extinction display using a lamp. For example, the display unit 106 displays a state of access to the recording medium 110 to be described below, and a communication state of the wireless communication unit 111 or a near field communication unit 112. The display unit 106 needs not be included in the camera 100. The camera 100 is only required to be connectable with an internal or external display unit 106, and include at least a display control function of controlling the display on the display unit 106.

The recording medium 110 can record image data output from the imaging unit 102.

The recording medium 110 may be detachably attached to the camera 100, or may be incorporated into the camera 100. In other words, the camera 100 is only required to include at least a unit for accessing the recording medium 110.

The wireless communication unit 111 is an interface for connecting with an external apparatus. The camera 100 of the present example embodiment can exchange data with an external apparatus via the wireless communication unit 111. The external apparatus is an information processing apparatus, such as a smartphone and a personal computer, that can perform wireless communication. For example, image data generated by the imaging unit 102 can be transmitted to an external apparatus via the wireless communication unit 111. In the present example embodiment, the wireless communication unit 111 includes an interface for communicating with an external apparatus via a so-called wireless local area network (LAN) complying with a communication standard of Institute of Electrical and Electronics Engineers (IEEE) 802.11. Hereinafter, wireless communication complying with a communication standard of the IEEE 802.11 will be described as wireless LAN communication. The control unit 101 can implement wireless communication with an external apparatus by controlling the wireless communication unit 111.

The near field communication unit 112 is an interface for wirelessly communicating with an external apparatus.

For example, the near field communication unit 112 includes an antenna, a modulation/demodulation circuit for processing wireless signals, and a communication controller. The external apparatus is an information processing apparatus, such as a smartphone and a personal computer, that can perform wireless communication. By outputting a modulated wireless signal from the antenna, and demodulating a wireless signal received by the antenna, the near field communication unit 112 implements near field communication complying with a communication standard of Bluetooth®. Hereinafter, wireless communication complying with a communication standard of Bluetooth® will be described as Bluetooth® communication. In the present example embodiment, the near field communication unit 112 includes a first near field communication unit 112a and a second near field communication unit 112b. Communication executed via the first near field communication unit 112a is Bluetooth® communication complying with Bluetooth® Low Energy (hereinafter, BLE). Communication executed via the second near field communication unit 112b is Bluetooth® communication complying with Bluetooth® Classic (hereinafter, BTC). Hereinafter, Bluetooth® communication complying with the BLE will be referred to as BLE communication, and Bluetooth® communication complying with the BTC will be referred to as BTC communication. Both the BLE and the BTC are standards defined by Bluetooth®, but are incompatible with each other.

Bluetooth® communication will now be described. A connection configuration of Bluetooth® communication is a master-slave star-type network. In the present example embodiment, a smartphone 200 described below is a communication apparatus (hereinafter, referred to as a master apparatus) operating as a master, and the camera 100 is a communication apparatus (hereinafter, referred to as a slave apparatus) operating as a slave. The master apparatus manages participation of slave apparatuses in networks, and sets various parameters in wireless connection with the slave apparatuses. While the master apparatus can concurrently connect with a plurality of slave apparatuses, each of the slave apparatuses can selectively establish wireless connection with only one master apparatus, and cannot concurrently connect with a plurality of master apparatuses.

In addition, master apparatuses cannot establish wireless connection with each other, and slave apparatuses cannot establish wireless connection with each other, either. For establishing wireless connection, one of the apparatuses must operate as a master apparatus and the other apparatus must operate as a slave apparatus.

Through the BLE communication, for example, the camera 100 can exchange data with relatively small capacity, such as time information and coordinate information of a global positioning system (GPS), with an external apparatus. Through the BTC communication, for example, the camera 100 can exchange data with relatively large capacity, such as image data and moving image data, with an external apparatus. In addition, the BLE communication generally consumes less power as compared with the BTC communication. In contrast, the BTC communication typically has higher communication speed as compared with the BLE communication. In addition, wireless LAN communication can implement communication with higher communication speed than those of the BLE communication and the BTC communication.

In the BLE communication, a master apparatus and a slave apparatus perform synchronous communication at a predetermined time interval. The predetermined time interval will be referred to as a connection interval. Hereinafter, the connection interval will also be referred to as a CI. In the BLE communication, the connection interval is set to a value larger than or equal to 7.5 milliseconds and smaller than or equal to 4 seconds, and set in increments of 1.25 milliseconds. In the BLE communication, a master apparatus sets or changes a connection interval. In a case where a slave apparatus sets or changes a connection interval, the slave apparatus transmits a request for setting or changing a connection interval to a master apparatus, and the master apparatus sets or changes a connection interval in response to the request.

In the present example embodiment, the camera 100 executes pairing with the smartphone 200 described below, and records connection information of the smartphone 200 into the nonvolatile memory 103. The pairing is processing in which a master apparatus and a slave apparatus register each other's connection information (record each other's connection information into a predetermined region). The connection information is an encryption key or a media access control (MAC) address, for example. In the present example embodiment, the camera 100 determines that pairing has been completed by establishing wireless connection with the smartphone 200 after registering each other's connection information together with the smartphone 200. Even if the connection is disconnected after being established, a paired state is still maintained. More specifically, the concept of pairing refers not to a connected state/unconnected state but to a state in which a master apparatus and a slave apparatus have registered each other's connection information.

The camera 100 of the present example embodiment can constantly connect with the smartphone 200 through BLE communication. Communication can then be automatically switched from the BLE communication to the BTC communication or wireless LAN communication in response to an operation from the camera 100 or the smartphone 200.

External appearance of the camera 100 will now be described. FIGS. 1B and 1C are diagrams illustrating an example of external appearance of the camera 100. A release button 105a, a reproduction button 105b, an arrow key 105c, a touch panel 105d, and a power lever 105e are operation members included in the above-described operation unit 105. An image obtained as a result of image capturing performed by the imaging unit 102 is displayed on the display unit 106.

Heretofore, a configuration example of the camera 100 has been described.

<System Diagram>

Figure 2:
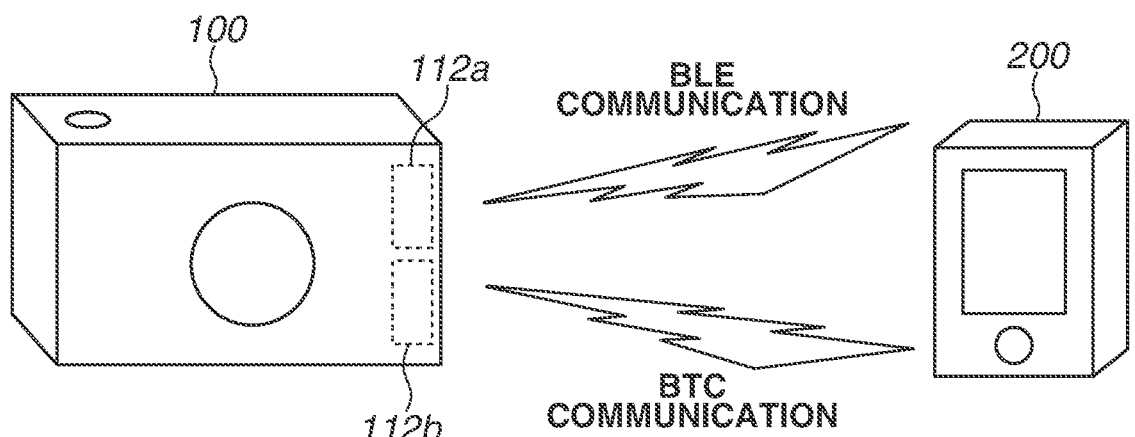
FIG. 2 is a schematic diagram illustrating a system including a camera and a smartphone according to the first and second example embodiments, in which the camera performs Bluetooth® communication with the smartphone.

FIG. 2 is a diagram illustrating an example of a system in which the camera 100 according to the present example embodiment and the smartphone 200 serving as an example of an external apparatus perform wireless communication with each other. In the present example embodiment, the camera 100 performs wireless communication with the smartphone 200 via the first near field communication unit 112a or the second near field communication unit 112b.

The communication executed via the first near field communication unit 112a is the BLE communication, and the communication executed via the second near field communication unit 112b is the BTC communication.

The smartphone 200 is an information processing apparatus capable of performing wireless communication. The smartphone 200 includes a BLE communication unit, a BTC communication unit, a wireless LAN communication unit, and a public wireless communication unit as communication units. In the smartphone 200, an operation system (OS) is recorded on a nonvolatile memory, and a control unit of the smartphone 200 implements various functions by executing applications on the OS. For example, in the present example embodiment, the smartphone 200 includes an application capable of remotely controlling the camera 100, such as an application that issues an image capturing instruction to the camera 100 through Bluetooth® communication, and an application that acquires image data through Bluetooth® communication. For example, the smartphone 200 can issue an image capturing instruction to the camera 100 through the BLE communication, and acquire image data through the BTC communication.

<Camera Screen Transition in Transferring Image Data>

Figure 3:
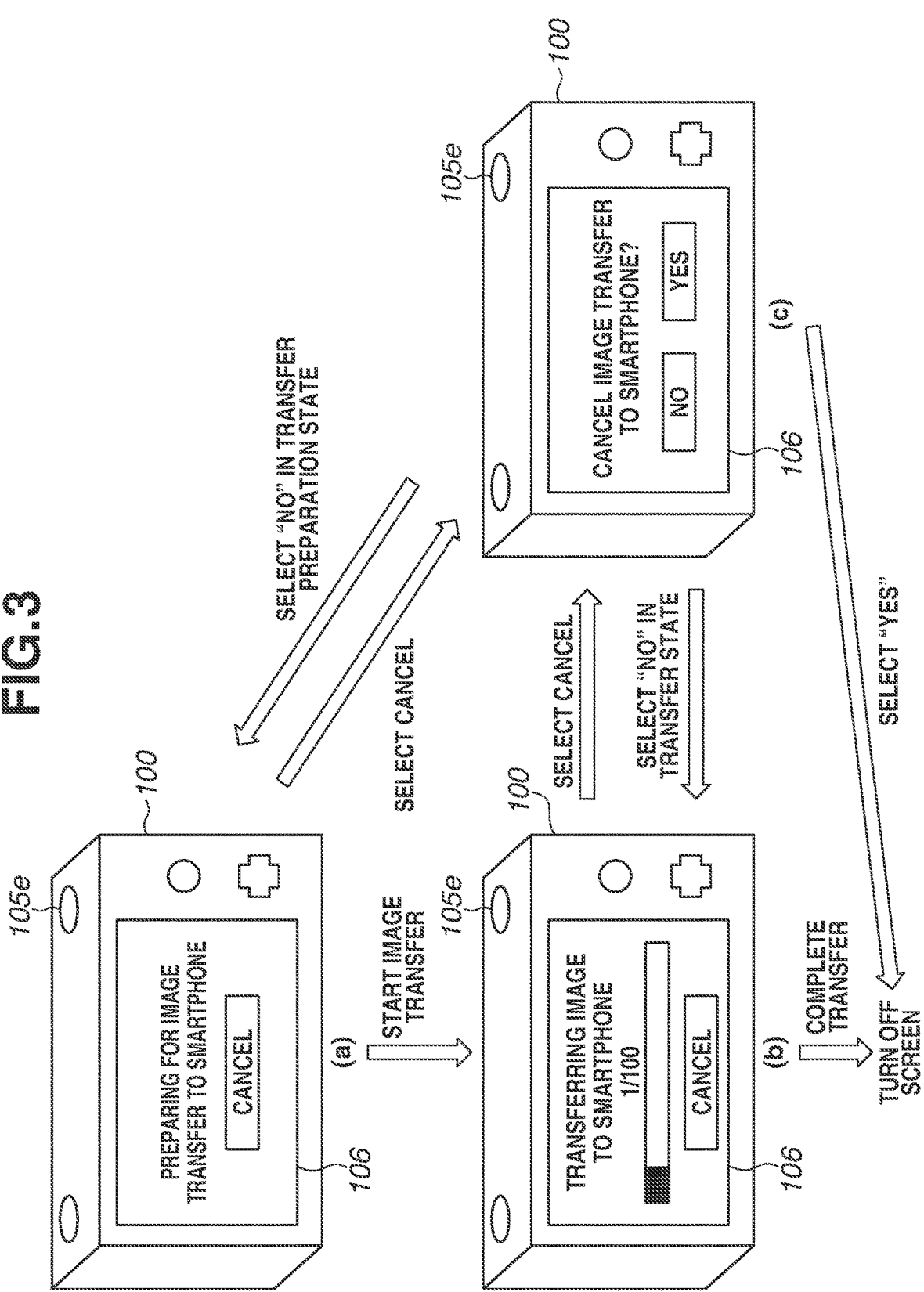
FIG. 3 is a transition diagram of a screen to be displayed on a display unit when the camera transfers a captured image to the smartphone through Bluetooth® communication according to the first and second example embodiments. Screen (a) illustrates a screen to be displayed when transfer is in preparation, screen (b) illustrates a screen to be displayed when transfer is being executed, and screen (c) illustrates a screen to be displayed when cancel is selected.

FIG. 3 illustrates an example of a transition diagram of a screen displayed on the display unit 106 of the camera 100 when the camera 100 transfers image data to the smartphone 200 through the BTC communication, according to the present example embodiment. In the present example embodiment, the execution of processing of transferring image data generated by the camera 100, to the smartphone 200 is triggered by the user performing a power-off operation of the camera 100 from the operation unit 105. Moreover, the processing of transferring image data generated by the camera 100 to the smartphone 200 is also executed in response to the camera 100 entering a state in which the camera 100 is to shift to a power saving mode, such as a case where the user has not operated the camera 100 for a predetermined period of time.

The user can switch ON or OFF of a function of the camera 100 that is provided for the camera 100 automatically transferring an image to the smartphone 200 being triggered by a power-off operation. Hereinafter, the function will also be referred to as an automatic image transfer function. For example, the setting of "enabled (ON)" or "disabled (OFF)" of the automatic image transfer function can be switched. In the description to be given with reference to FIG. 3, "enabled" is set.

Screen (a) in FIG. 3 illustrates an example of a screen of the camera 100 that is to be displayed when image data transfer is in preparation. The screen is displayed during a period from when a power-off operation is performed to when image data transfer processing is started, for example. In response to the start of image data transfer, the camera 100 displays a screen indicating that image data transfer is being executed, as illustrated in screen (b) in FIG. 3. The camera 100 displays, for example, a progress bar or the number of transferred image data for indicating the progress of image data transfer, and the total number of image data to be transferred. The camera 100 turns off the screen upon the completion of the image data transfer.

When the camera 100 is in a state as illustrated in screen (a) or (b), the user can stop transfer processing of image data. For example, the user selects a "CANCEL" button on the display unit 106 in screen (a) or (b) via the operation unit 105. In response to the operation, the camera 100 displays a screen for confirming whether to stop transfer processing of image data, as illustrated in screen (c). By the user selecting "YES" and determining the selection via the operation unit 105 on the screen, the camera 100 stops transfer processing of image data to the smartphone 200 and turns off the screen. In contrast, in a case where the user selects "NO" and determines the selection via the operation unit 105 on the screen, the camera 100 returns to the previous state. In other words, in a case where the "CANCEL" button is determined when image data transfer is in preparation, the camera 100 shifts the screen to the screen illustrated in screen (a), and in a case where the "CANCEL" button is determined when image data is being transferred, the camera 100 shifts the screen to the screen illustrated in screen (b).

<Processing Sequence to be Executed in Case Where Image Data is not Transferred>

Figure 4:
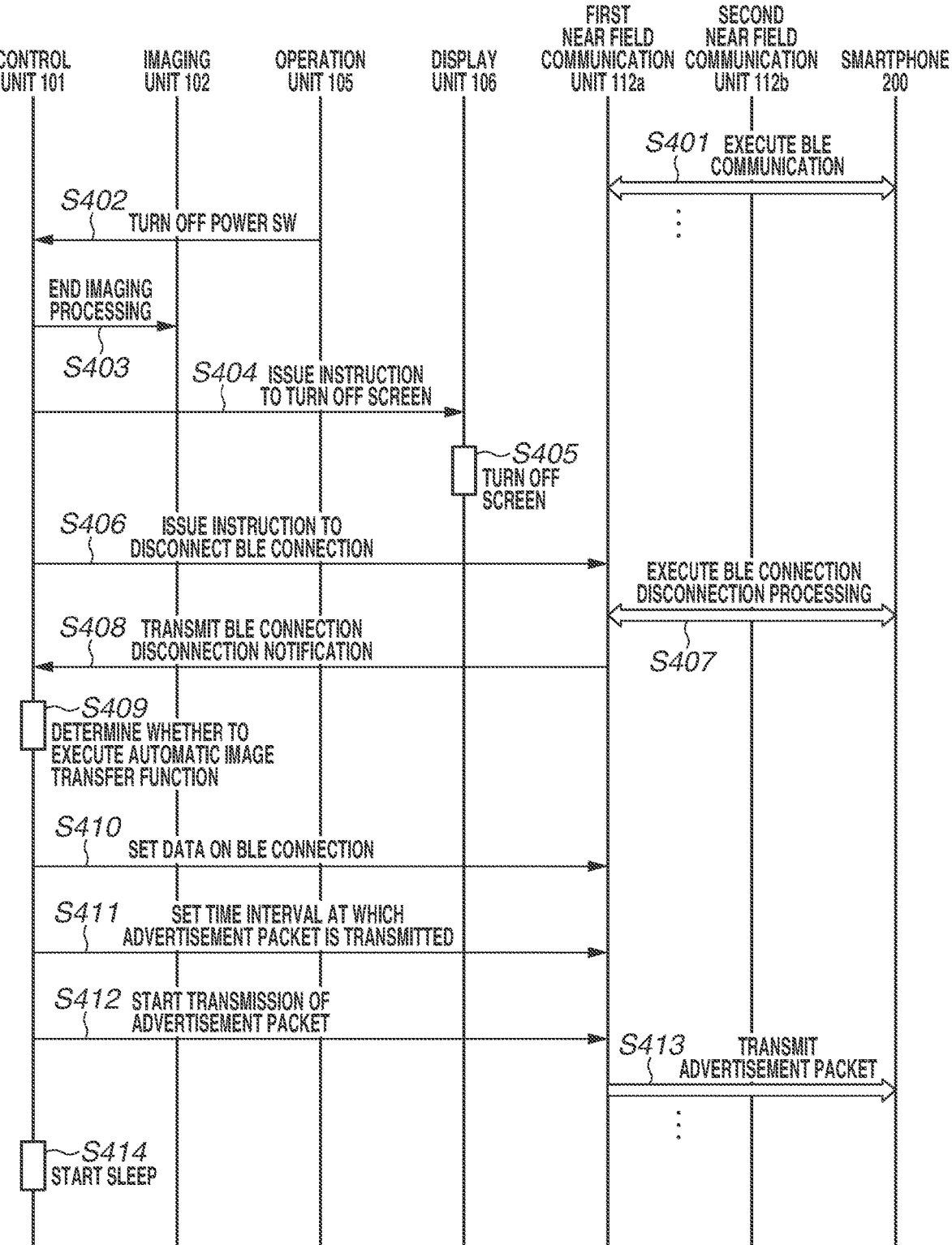
FIG. 4 illustrates a sequence diagram of processing according to the first example embodiment that is to be executed when a setting is set in which the camera does not transfer a captured image to the smartphone through Bluetooth® communication.

FIG. 4 is a sequence diagram illustrating processing according to the present example embodiment that is to be executed in a case where the camera 100 is set not to transfer image data to the smartphone 200.

The camera 100 and the smartphone 200 are assumed to have completed pairing for Bluetooth® communication. It is also assumed that BLE connection between the camera 100 and the smartphone 200 is established at the start time of this sequence.

In the description to be given with reference to FIG. 4, the automatic image transfer function is set to "enabled".

In step S401, the first near field communication unit 112a executes the BLE communication with the smartphone 200.

In step S402, a signal for powering off the camera 100 is output from the operation unit 105 to the control unit 101 in response to a user operation.

In step S403, the control unit 101 performs processing for ending imaging processing executed by the imaging unit 102. Instead of being executed in response to a power-off instruction (processing in step S402) issued via the operation unit 105, the processing in step S403 may be automatically executed in response to the user not operating the camera 100 for a predetermined period of time.

In step S404, the control unit 101 performs processing for turning off the screen of the display unit 106.

In step S405, the display unit 106 turns off the screen.

In step S406, the control unit 101 performs processing (instruction) to disconnect BLE connection on the first near field communication unit 112a.

The control unit 101 performs the processing to disconnect BLE connection in this step to shift the camera 100 to a power-off state and for saving power consumption.

In step S407, the first near field communication unit 112a performs disconnection processing of BLE connection with the smartphone 200.

In step S408, the first near field communication unit 112a notifies the control unit 101 that disconnection of BLE connection has been completed.

In step S409, the control unit 101 determines whether to execute the automatic image transfer function.

In this sequence, the automatic image transfer function is set to "disabled", and thereby the control unit 101 does not perform processing of executing the automatic image transfer function.

In step S410, the control unit 101 sets data on BLE connection that is included in an advertisement packet into the first near field communication unit 112a. The advertisement packet is a beacon signal for notifying a nearby device of the existence of itself in the BLE communication, and is transmitted at a predetermined time interval. The predetermined time interval may be a time interval different from a connection interval (CI) of the BLE communication. The data on BLE connection is data regarding whether to automatically start BLE connection. The data on BLE connection that is transmitted in this step includes data for notifying that BLE connection is not started automatically.

In step S411, the control unit 101 sets a time interval at which an advertisement packet is transmitted, in the first near field communication unit 112a. The time interval is set to an interval longer than a connection interval set in the BLE communication so as to save power consumption of the camera 100.

In step S412, the control unit 101 issues an instruction to the first near field communication unit 112a to start the transmission of an advertisement packet.

In step S413, the first near field communication unit 112a transmits an advertisement packet at the time interval set in step S411. In other words, in the present example embodiment, the camera 100 wirelessly communicates with the smartphone 200 using an advertisement packet in a sleep state.

In step S414, the control unit 101 performs control for the camera 100 to shift to a power saving state (sleep state).

In step S413 and a subsequent step, the smartphone 200 receives an advertisement packet from the first near field communication unit 112*a*, but does not automatically establish BLE connection with the camera 100, based on the data on BLE connection that has been received in step S410. In a case where the user performs an operation of establishing BLE connection with the camera 100, the smartphone 200 executes processing for establishing BLE connection with the camera 100. With this configuration, the camera 100 can maintain the sleep state in a case where the camera 100 does not transfer an image, and save power consumption.

Heretofore, a processing sequence to be executed in a case where the camera 100 is set not to transfer image data to the smartphone 200 has been described.

<BTC Connection Processing Sequence to be Executed in Case Where Image Data is Transferred>

Figure 5:
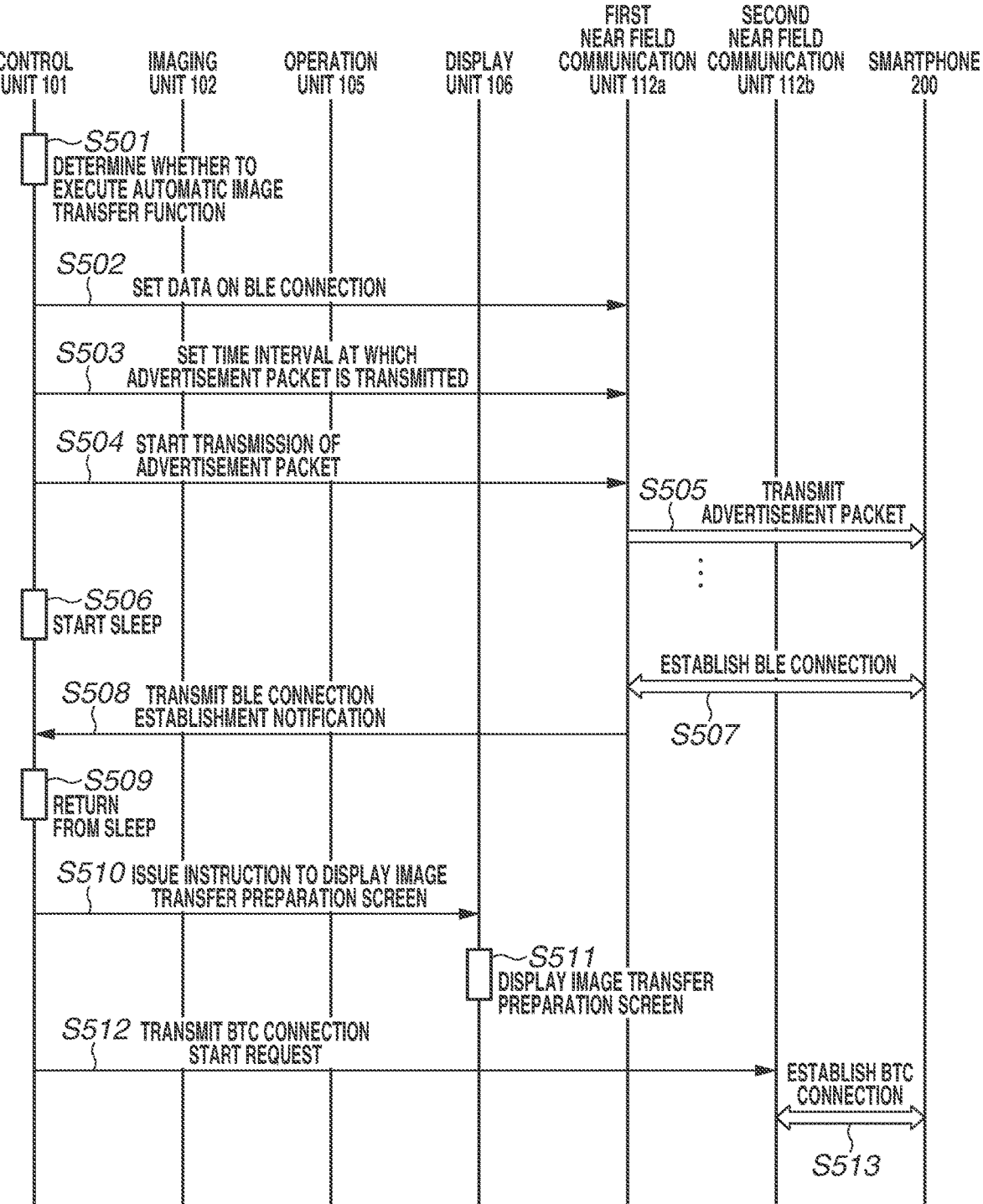
FIG. 5 illustrates a sequence diagram of processing according to the first example embodiment that is to be executed when a setting is set in which the camera transfers a captured image to the smartphone through Bluetooth® communication.

FIG. 5 is a sequence diagram illustrating processing up to establishment of BTC connection according to the present example embodiment that is to be executed in a case where the camera 100 is set to transfer image data to the smartphone 200.

The camera 100 and the smartphone 200 are assumed to have completed pairing for Bluetooth® communication. BLE connection between the camera 100 and the smartphone 200 is also assumed to be established at the start time of this sequence.

In addition, in the description to be given with reference to FIG. 5, the automatic image transfer function is set to "enabled".

Before processing in step S501 of FIG. 5, the processing in steps S401 to S408 of FIG. 4 is executed.

In step S501, the control unit 101 determines whether to execute the automatic image transfer function.

In this sequence, the automatic image transfer function is set to "enabled", and therefore the control unit 101 performs processing of executing the automatic image transfer function.

In step S502, the control unit 101 sets data on BLE connection that is included in an advertisement packet, in the first near field communication unit 112*a*. In this step, the data on BLE connection includes data for notifying that BLE connection is automatically started.

In step S503, the control unit 101 sets a time interval at which an advertisement packet is transmitted, in the first near field communication unit 112*a*. The time interval is shorter than the time interval of an advertisement packet that has been set in step S411 of FIG. 4, so as to shorten a time until the smartphone 200 receives an advertisement packet. For example, the time interval has the same length of time interval as the length of the connection interval of the BLE communication in step S401 of FIG. 4.

In step S504, the control unit 101 issues an instruction to the first near field communication unit 112*a* to start the transmission of an advertisement packet.

In step S505, the first near field communication unit 112*a* transmits an advertisement packet at the time interval set in step S503.

In step S506, the control unit 101 performs control for the camera 100 to shift to the power saving state (sleep state).

In step S507, the smartphone 200 automatically establishes BLE connection with the first near field communication unit 112*a* upon receiving an advertisement packet.

In step S508, the first near field communication unit 112*a* outputs a signal indicating that BLE connection has been established, to the control unit 101.

In step S509, the control unit 101 controls the camera 100 to return from the sleep state.

In step S510, the control unit 101 performs processing for displaying a screen indicating that image data transfer is to be executed, on the display unit 106.

In step S511, a screen to be displayed when image data transfer is in preparation is displayed on the display unit 106 as illustrated in screen (a) in FIG. 3.

In step S512, the control unit 101 transmits a start request of BTC connection to the second near field communication unit 112*b*.

In step S513, the second near field communication unit 112*b* establishes BTC connection with the smartphone 200. Thereafter, the camera 100 transfers image data to the smartphone 200 through the BTC communication.

Heretofore, a processing sequence up to establishment of BTC connection has been described: the processing sequence is to be executed in a case where the camera 100 is set to transfer image data to the smartphone 200.

<BTC Connection to be Established in Case where BLE Connection is not Established>

Figure 6:
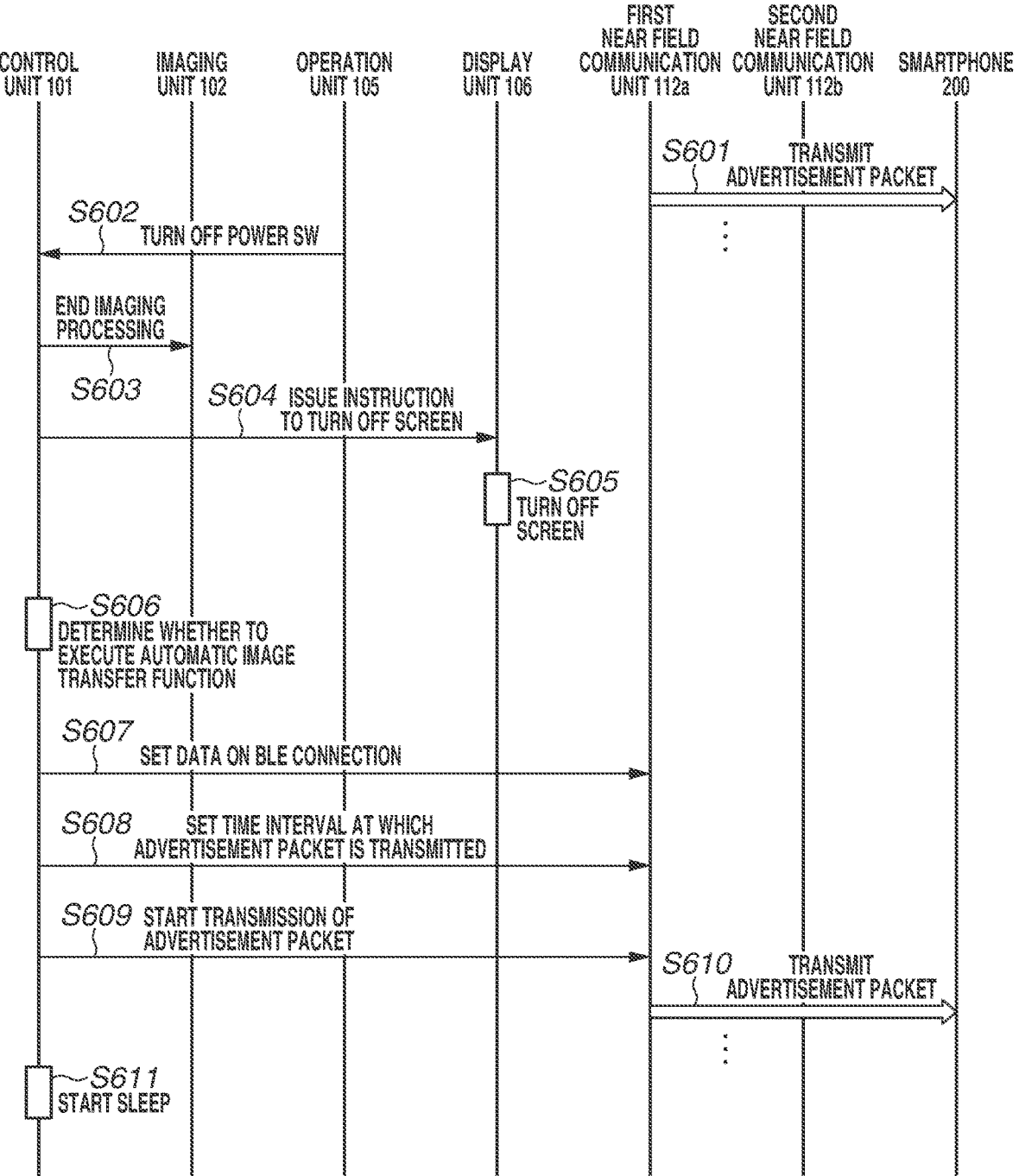
FIG. 6 illustrates a sequence diagram of processing according to the first example embodiment that is to be executed when a setting is set in which the camera transfers a captured image to the smartphone through Bluetooth® communication, but the camera is not connected with the smartphone through Bluetooth® communication.

FIG. 6 is a sequence diagram illustrating processing according to the present example embodiment that is to be executed in a case where the camera 100 is set to transfer image data to the smartphone 200, but BLE connection with the smartphone 200 is not established. The camera 100 and the smartphone 200 are assumed to have completed pairing for Bluetooth® communication.

In step S601, the first near field communication unit 112*a* transmits an advertisement packet.

In step S602, a signal for powering off the camera 100 is output from the operation unit 105 to the control unit 101 in response to a user operation.

In step S603, the control unit 101 performs processing for ending imaging processing executed by the imaging unit 102. Instead of being executed in response to a power-off instruction (processing in step S602) performed via the operation unit 105, the processing in step S603 may be automatically executed in response to the user not operating the camera 100 for a predetermined period of time.

In step S604, the control unit 101 performs processing for turning off the screen of the display unit 106.

In step S605, the display unit 106 turns off the screen.

In step S606, the control unit 101 determines whether to execute the automatic image transfer function.

In this sequence, the automatic image transfer function is "enabled", but because the camera 100 has not established BLE connection with the smartphone 200, the camera 100 does not perform processing for transferring image data. The reason why the camera 100 does not perform image transfer processing lies in that the user might desire the camera 100 and the smartphone 200 not to wirelessly communicate with each other, because the user has not established BLE connection between the camera 100 and the smartphone 200.

Processing in steps S607 to S611 is similar to the processing in steps S410 to S414, and thus the description thereof will be omitted.

Heretofore, a processing sequence according to the present example embodiment has been described: the processing sequence is to be executed in a case where the camera 100 is set to transfer image data to the smartphone 200, but BLE connection with the smartphone 200 is not established.

<Communication Executed in Case where Smartphone Cannot Receive Image Data>

Figure 7:
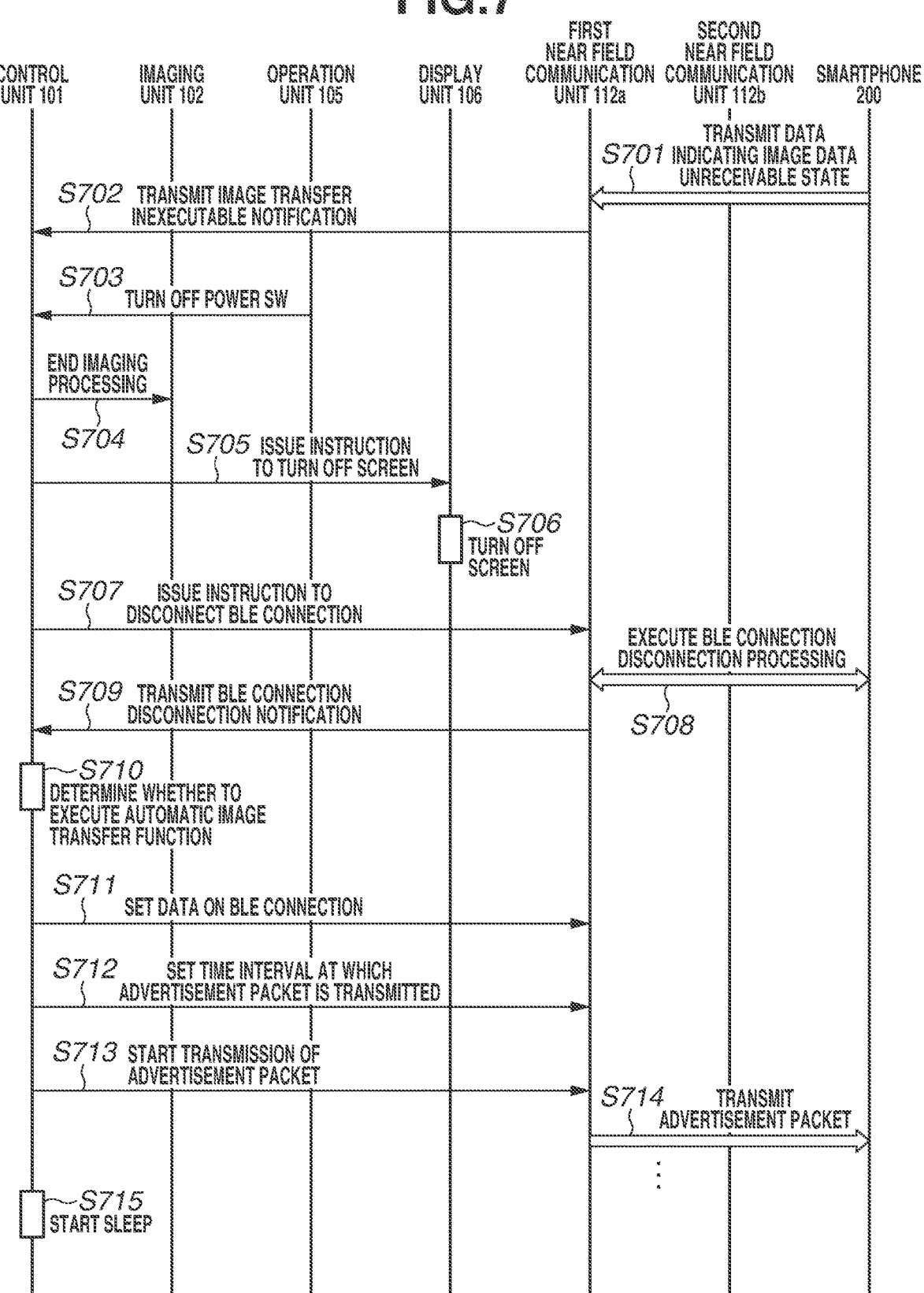
FIG. 7 illustrates a sequence diagram of processing according to the first example embodiment that is to be executed when a setting is set in which the camera transfers a captured image to the smartphone through Bluetooth® communication, but the smartphone is in a state in which the smartphone cannot receive a transferred image.

FIG. 7 is a sequence diagram illustrating processing according to the present example embodiment that is to be executed in a case where the camera 100 is set to transfer image data to the smartphone 200, but the smartphone 200 is in a state in which the smartphone 200 cannot receive image data. Examples of the state in which the smartphone 200 cannot receive image data include a case where the smartphone 200 exchanges data with another communication apparatus through wireless LAN communication.

The camera 100 and the smartphone 200 are assumed to have completed pairing for Bluetooth® communication. In addition, BLE connection between the camera 100 and the smartphone 200 is assumed to be established at the start time of this sequence.

In addition, in the description to be given with reference to FIG. 7, the automatic image transfer function is set to "enabled".

In step S701, the smartphone 200 transmits data indicating that the smartphone 200 is in a state in which the smartphone 200 cannot receive image data, to the first near field communication unit 112*a*.

In step S702, the first near field communication unit 112*a* outputs the data indicating that the smartphone 200 is in a state in which the smartphone 200 cannot receive image data, to the control unit 101.

In step S703, a signal for powering off the camera 100 is output from the operation unit 105 to the control unit 101 in response to a user operation.

In step S704, the control unit 101 performs processing for ending imaging processing executed by the imaging unit 102. Instead of being executed in response to a power-off instruction (processing in step S703) performed via the operation unit 105, the processing in step S704 may be automatically executed in response to the user not operating the camera 100 for a predetermined period of time.

In step S705, the control unit 101 performs processing for turning off the screen of the display unit 106.

In step S706, the display unit 106 turns off the screen.

In step S707, the control unit 101 performs processing (instruction) for disconnecting BLE connection, on the first near field communication unit 112*a*.

In step S708, the first near field communication unit 112*a* performs disconnection processing of BLE connection with the smartphone 200.

In step S709, the first near field communication unit 112*a* notifies the control unit 101 that disconnection of BLE connection has been completed.

In step S710, the control unit 101 determines whether to execute the automatic image transfer function.

In this sequence, the automatic image transfer function is set to "disabled", but the control unit 101 recognizes in step S702 that the smartphone 200 is in a state in which the smartphone 200 cannot receive image data, and thus the control unit 101 determines not to execute automatic image transfer processing.

Because processing performed in steps S711 to S715 is similar to the processing in steps S410 to S414 of FIG. 4, the description will be omitted.

Heretofore, a processing sequence according to the present example embodiment has been described: the processing sequence is to be executed in a case where the camera 100 is set to transfer image data to the smartphone 200, but the smartphone 200 is in a state in which the smartphone 200 cannot receive image data.
<Operation of Camera>

Figure 8:
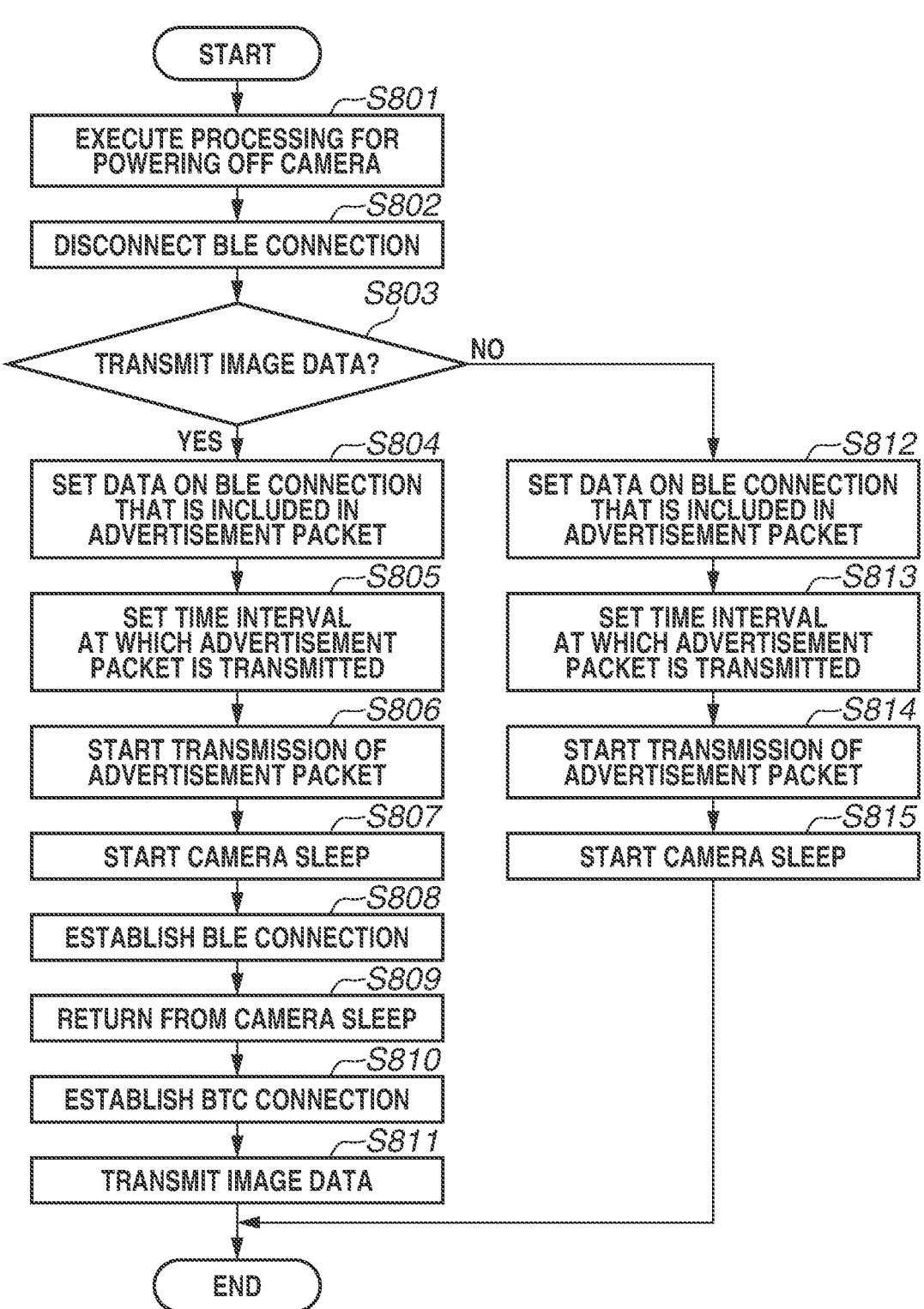
FIG. 8 is a flowchart illustrating processing according to the first example embodiment that is to be executed up to the time when the camera starts to transfer a captured image to the smartphone through Bluetooth® communication.

FIG. 8 is a flowchart illustrating an example of an operation of the camera 100 according to the present example embodiment.

The processing of the flowchart is implemented by the control unit 101 executing a program recorded on the nonvolatile memory 103.

In step S801, the control unit 101 executes processing for powering off the camera 100, in response to the user performing a power-off operation via the operation unit 105. For example, the control unit 101 controls the imaging unit 102 to end imaging processing, and controls the display unit 106 to turn off the screen. Instead of executing the processing in response to a power-off operation performed via the operation unit 105, the control unit 101 may execute the processing for powering off the camera 100, in response to the user not operating the camera 100.

In step S802, the control unit 101 disconnects BLE connection with the smartphone 200 using the first near field communication unit 112*a*.

In step S803, the control unit 101 determines whether to transmit image data to the smartphone 200. For example, the control unit 101 determines whether to transmit image data to the smartphone 200, based on whether the automatic image transfer function is enabled or disabled, and whether BLE connection with the smartphone 200 has been established. In a case where the automatic image transfer function is enabled and the camera 100 is wirelessly connected with the smartphone 200, the control unit 101 determines to transmit image data to the smartphone 200. In a case where the automatic image transfer function is disabled or the camera 100 is not wirelessly connected with the smartphone 200, the control unit 101 determines not to transmit image data to the smartphone 200.

A case will now be described where the control unit 101 determines to transmit image data to the smartphone 200 (YES in step S803).

In step S804, the control unit 101 sets data on BLE connection that is included in an advertisement packet, in the first near field communication unit 112*a*. In this step, the data on BLE connection includes data for notifying that BLE connection is automatically started.

In step S805, the control unit 101 sets a time interval at which an advertisement packet is transmitted, in the first near field communication unit 112*a*. For example, the time interval has the same length of time interval as the length of the connection interval of the BLE communication.

In step S806, the control unit 101 starts transmission of an advertisement packet via the first near field communication unit 112*a*.

In step S807, the control unit 101 performs control for the camera 100 to shift to the power saving state (sleep state).

In step S808, the control unit 101 establishes BLE connection with the smartphone 200 via the first near field communication unit 112*a*.

In step S809, the control unit 101 controls the camera 100 to shift to a power-on state from the sleep state, upon receiving a notification indicating that BLE connection has been established, from the first near field communication unit 112*a*.

In step S810, the control unit 101 establishes BTC connection with the smartphone 200 via the second near field communication unit 112*b*.

In step S811, the control unit 101 transmits image data to the smartphone 200 through the BTC communication. In a case where the control unit 101 has transmitted all pieces of image data to be transmitted to the smartphone 200, the control unit 101 controls the camera 100 to shift to the sleep state, and ends the processing of this flowchart.

Next, a case where the control unit 101 determines in step S803 not to transmit image data to the smartphone 200 (NO in step S803) will be described.

In step S812, the control unit 101 sets data on BLE connection that is included in an advertisement packet, in the first near field communication unit 112*a*. In this step, the data on BLE connection includes data for notifying that BLE connection is not automatically started.

In step S813, the control unit 101 sets a time interval at which an advertisement packet is transmitted, in the first near field communication unit 112*a*. For example, the time interval is a time interval longer than the connection interval of the BLE communication.

In step S814, the control unit 101 starts transmission of an advertisement packet via the first near field communication unit 112*a*.

In step S815, the control unit 101 performs control for the camera 100 to shift to the power saving state (sleep state), and ends the processing of this flowchart.

Heretofore, an operation of the camera 100 has been described.

As described above, according to the present example embodiment, the camera 100 varies a time interval at which an advertisement packet is transmitted, between the case of transmitting image data to the smartphone 200 in response to a power-off operation on the camera 100 and the case of not transmitting image data. Specifically, in the case of transmitting image data, the camera 100 sets a shorter time interval than a time interval set in the case of not transmitting image data. The camera 100 can thereby achieve both of enhancement in responsivity in the case of transmitting image data, and the reduction in power consumption in the case of not transmitting image data.

In the present example embodiment, BTC has been described as a communication standard used for transmission of image data, but another communication standard may be used. For example, a communication standard used for transmission of image data may be a communication standard according to which communication with high communication speed can be executed, such as a public wireless communication standard including 4G and 5G, and the IEEE 802.11 (wireless LAN).

In a case where a state shifts from the sleep state to the power-on state, the camera 100 wirelessly communicates with the smartphone 200 at a connection interval set before the camera 100 enters the sleep state.

In the first example embodiment, a case has been described where the camera 100 disconnects BLE connection in response to a power-off operation. In a second example embodiment, a case where the camera 100 does not disconnect BLE connection will be described. Also in the second example embodiment, apparatus configurations of the camera 100 and the smartphone 200 and a system configuration are similar to those of the first example embodiment.

<Processing Sequence to be Executed in Case where Image Data is not Transferred>

Figure 9:
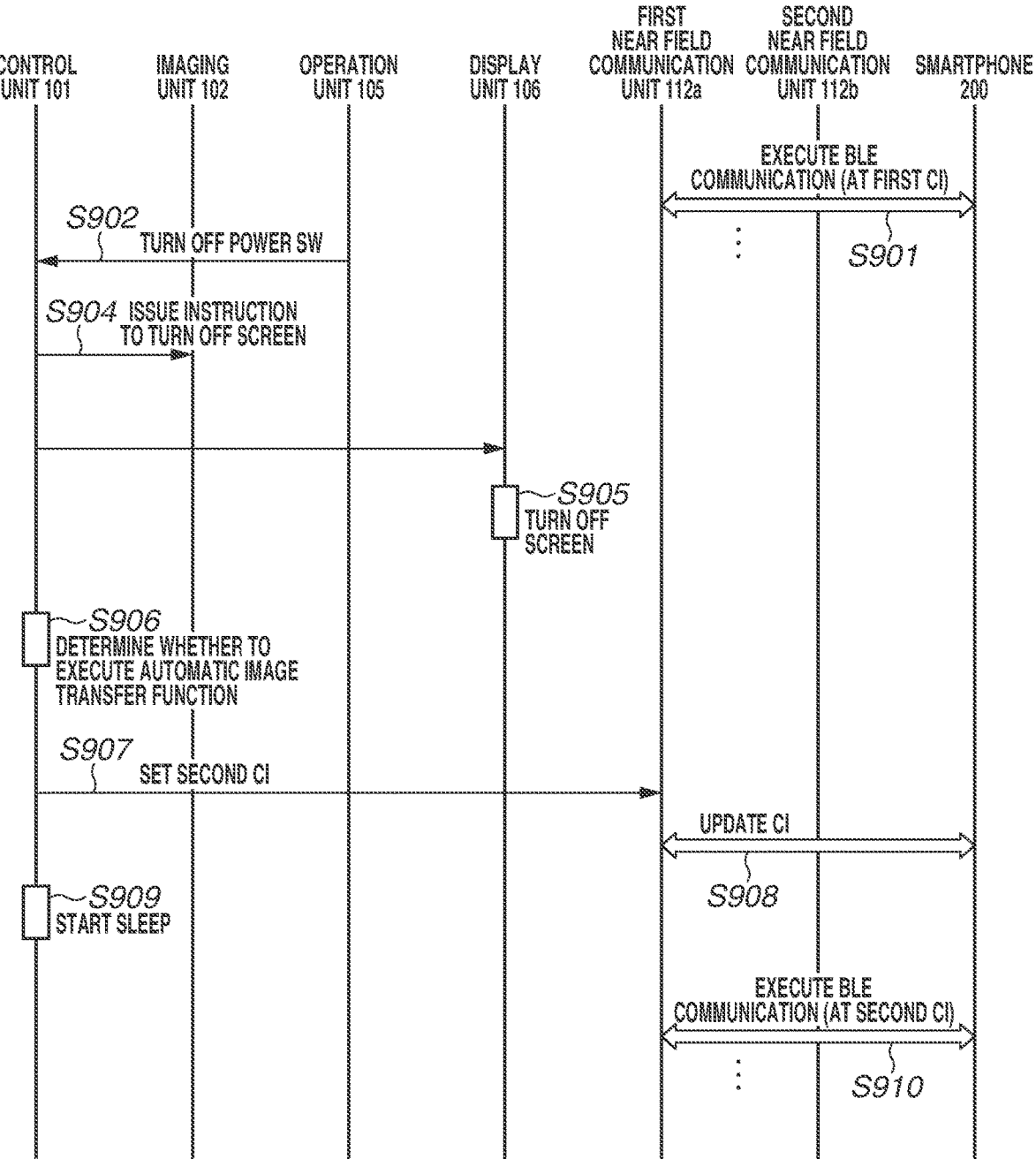
FIG. 9 illustrates a sequence diagram of processing according to a second example embodiment that is to be executed when a setting is set in which the camera does not transfer a captured image to the smartphone through Bluetooth® communication.

FIG. 9 is a sequence diagram illustrating processing according to the present example embodiment that is to be executed in a case where the camera 100 is set not to transfer image data to the smartphone 200.

The camera 100 and the smartphone 200 are assumed to have completed pairing for Bluetooth® communication. BLE connection between the camera 100 and the smartphone 200 is assumed to be established at the start time of this sequence.

In addition, when a power-off operation is performed via the operation unit 105, a function of transferring a captured image to the smartphone 200 can be set to "enabled" or "disabled". In the description to be given with reference to FIG. 9, the automatic image transfer function is set to "disabled".

In step S901, the first near field communication unit 112*a* executes the BLE communication with the smartphone 200. A connection interval set at the time is called a first connection interval.

In step S902, a signal for powering off the camera 100 is output from the operation unit 105 to the control unit 101 in response to a user operation.

Thereafter, the control unit 101 performs processing for ending imaging processing executed by the imaging unit 102. Instead of being executed in response to a power-off instruction (processing in step S902) performed by the operation unit 105, the processing for ending imaging processing may be automatically executed in response to the user not operating the camera 100 for a predetermined period of time.

In step S904, the control unit 101 performs processing for turning off the screen of the display unit 106.

In step S905, the display unit 106 turns off the screen.

In step S906, the control unit 101 determines whether to execute the automatic image transfer function.

In this sequence, the automatic image transfer function is set to "disabled", and thus the control unit 101 does not perform processing for executing the automatic image transfer function. Unlike the first example embodiment, the control unit 101 does not perform processing for disconnecting BLE connection.

In step S907, the control unit 101 issues an instruction to the first near field communication unit 112*a* to communicate with the smartphone 200 at a second connection interval that is a time interval longer than the first connection interval. In the present example embodiment, in the BLE communication executed between the camera 100 and the smartphone 200, the camera 100 operates as a slave apparatus and the smartphone 200 operates as a master apparatus.

In the present example embodiment, the camera 100 transmits a change request to the smartphone 200 in such a manner as to change the connection interval to the second connection interval (corresponding to the processing in step S908). The smartphone 200 makes a response to the connection interval change request from the camera 100, irrespective of whether the connection interval is to be changed. The response includes data for instructing whether to change the connection interval. The response also includes a timing at which the connection interval is to be changed, in a case where the connection interval is to be changed. The timing at which the connection interval is changed is a timing after n cycles (n is a natural number smaller than or equal to 6) of a time interval between a time when the response to the connection interval change request is transmitted and a time when the connection interval is changed.

The smartphone 200 then notifies the camera 100 that the connection interval has been changed at the timing at which the connection interval is to be changed. Thereafter, the camera 100 and the smartphone 200 communicate with each other based on the changed connection interval (second CI). As described above, the second connection interval is larger than the first connection interval.

With this configuration, in the second example embodiment, the camera 100 can enhance responsivity of communication with the smartphone 200 more than that in the first example embodiment.

In step S908, the control unit 101 controls the camera 100 to communicate with the smartphone 200 at the second connection interval via the first near field communication unit 112*a*. For example, the camera 100 transmits a change request to the smartphone 200 in such a manner as to change the connection interval to the second connection interval.

The smartphone 200 makes a response to the change request received from the camera 100. The response includes data for conveying whether to change the connection interval. The response also includes a timing at which the connection interval is to be changed, in a case where the connection interval is to be changed.

In step S909, the control unit 101 performs control for the camera 100 to shift to a power saving state (sleep state).

In step S910, the first near field communication unit 112*a* continues the BLE communication with the smartphone 200 at the second connection interval.

Heretofore, a processing sequence to be executed in a case where the camera 100 is set not to transfer image data to the smartphone 200 has been described.

<BTC Connection Processing Sequence to be Executed in Case where Image Data Is Transferred>

Figure 10:
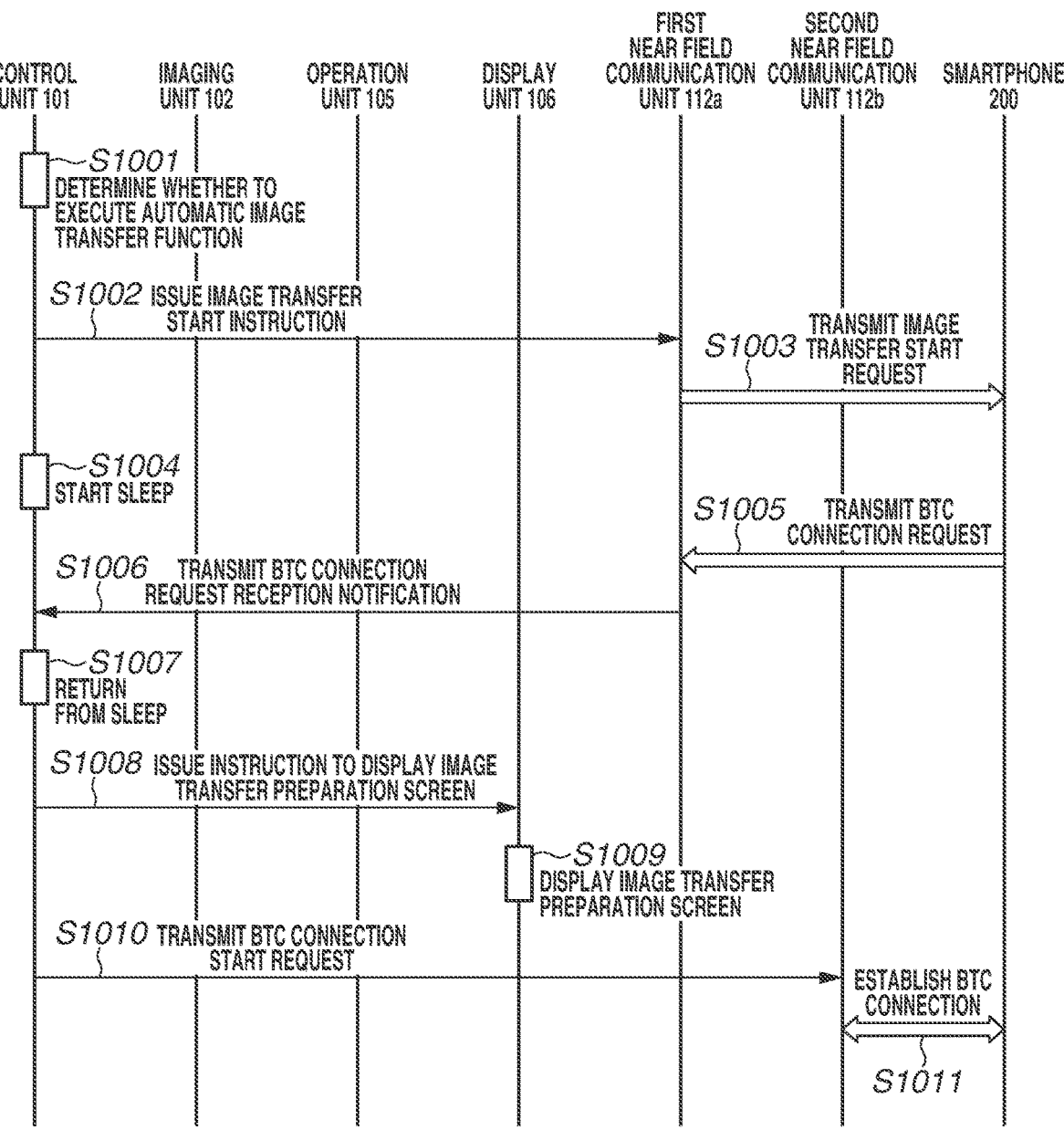
FIG. 10 illustrates a sequence diagram of processing according to the second example embodiment that is to be executed when a setting is set in which the camera transfers a captured image to the smartphone through Bluetooth® communication.

FIG. 10 is a sequence diagram illustrating processing up to establishment of BTC connection according to the present example embodiment that is to be executed in a case where the camera 100 is set to transfer image data to the smartphone 200.

The camera 100 and the smartphone 200 are assumed to have completed pairing for Bluetooth® communication. In addition, BLE connection between the camera 100 and the smartphone 200 is assumed to be established at the start time of this sequence.

Before the processing of this sequence is started, the processing in steps S901 to S908 of FIG. 9 is assumed to be executed.

In step S1001, the control unit 101 determines whether to execute the automatic image transfer function. In this sequence, the automatic image transfer function is set to "enabled", and thus the control unit 101 performs processing for executing the automatic image transfer function. In this step, the control unit 101 does not change the first connection interval to execute transmission processing of image data.

In step S1002, the control unit 101 issues an instruction to the first near field communication unit 112*a* to transmit a request for starting the transmission of image data, to the smartphone 200.

In step S1003, the first near field communication unit 112*a* transmits a request for starting the transmission of image data, to the smartphone 200.

In step S1004, the control unit 101 performs control for the camera 100 to shift to the power saving state (sleep state).

In step S1005, the smartphone 200 transmits a request for establishing BTC connection, to the first near field communication unit 112*a*.

In step S1006, data indicating that the request for establishing BTC connection has been received is output from the first near field communication unit 112*a* to the control unit 101.

In step S1007, the control unit 101 controls the camera 100 to return from the sleep state.

In step S1008, the control unit 101 performs processing for displaying a screen indicating that image data transfer is to be executed, on the display unit 106.

In step S1009, a screen to be displayed when image data transfer is in preparation as illustrated in screen (a) in FIG. 3 is displayed on the display unit 106.

In step S1010, the control unit 101 transmits a start request of BTC connection to the second near field communication unit 112*b*.

In step S1011, the second near field communication unit 112*b* establishes BTC connection with the smartphone 200.

Thereafter, the camera 100 transfers image data to the smartphone 200 through the BTC communication.

Heretofore, a processing sequence up to establishment of BTC connection has been described: the processing sequence is to be executed in a case where the camera 100 is set to transfer image data to the smartphone 200.

<Communication Executed in Case where Smartphone Cannot Receive Image Data>

Figure 11:
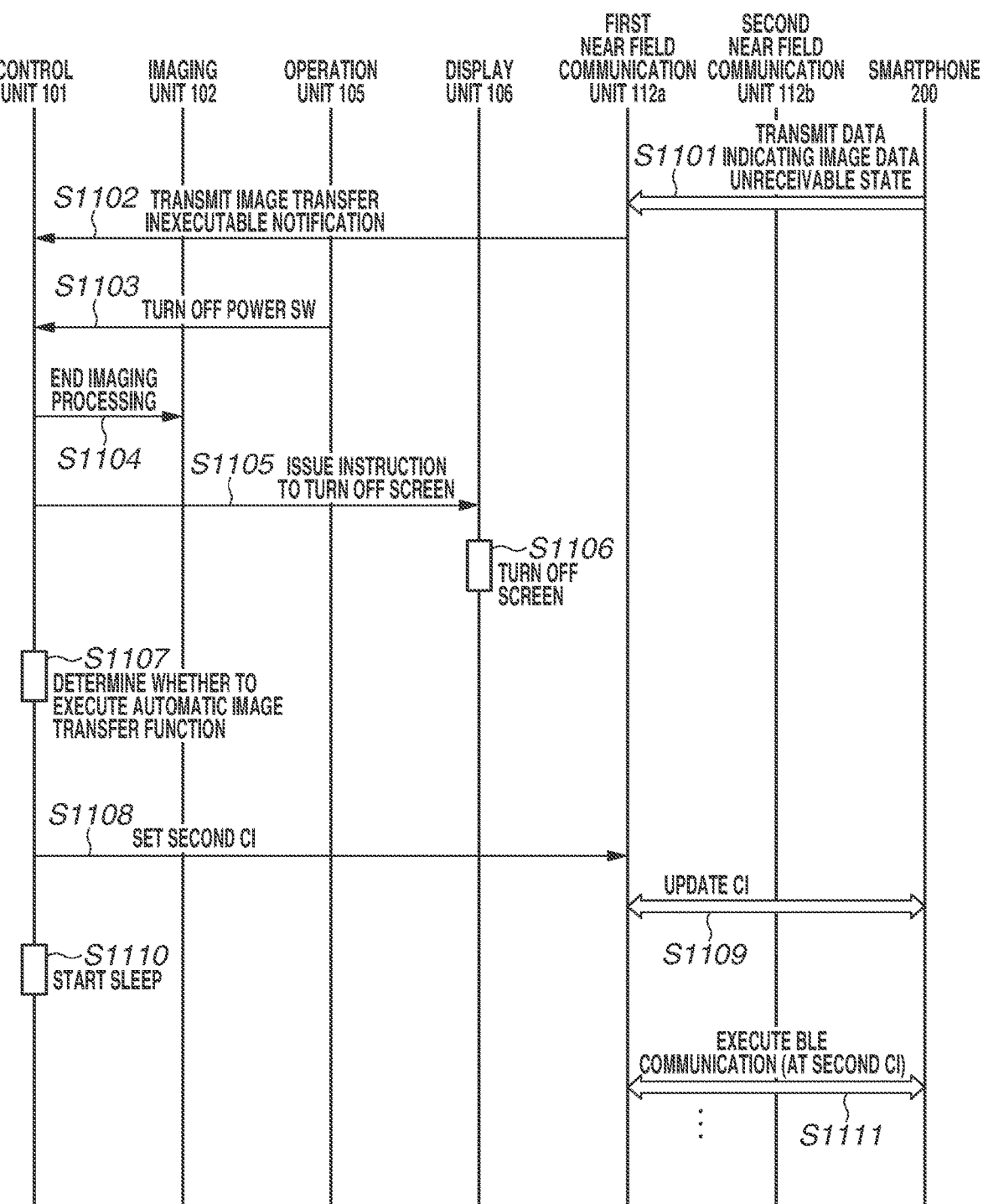
FIG. 11 illustrates a sequence diagram of processing according to the second example embodiment is set that is to be executed when a setting in which the camera transfers a captured image to the smartphone through Bluetooth® communication, but the smartphone cannot receive a transferred image.

FIG. 11 is a sequence diagram illustrating processing according to the present example embodiment that is to be executed in a case where the camera 100 is set to transfer image data to the smartphone 200, but the smartphone 200 is in a state in which the smartphone 200 cannot receive image data. Examples of the state in which the smartphone 200 cannot receive image data include a case where the smartphone 200 exchanges data with another communication apparatus through wireless LAN communication.

The camera 100 and the smartphone 200 are assumed to have completed pairing for Bluetooth® communication. In addition, BLE connection between the camera 100 and the smartphone 200 is assumed to be established at the start time of this sequence.

In addition, in the description to be given with reference to FIG. 11, the automatic image transfer function is set to "enabled".

In step S1101, the smartphone 200 notifies the first near field communication unit 112*a* that the smartphone 200 is in a state in which the smartphone 200 cannot receive image data.

In step S1102, the first near field communication unit 112*a* outputs, to the control unit 101, data indicating that the smartphone 200 is in a state in which the smartphone 200 cannot receive image data.

In step S1103, a signal for powering off the camera 100 is output from the operation unit 105 to the control unit 101 in response to a user operation.

In step S1104, the control unit 101 performs processing for ending imaging processing executed by the imaging unit 102. Instead of being executed in response to a power-off instruction (processing in step S1103) performed via the operation unit 105, the processing in step S1104 may be automatically executed in response to the user not operating the camera 100 for a predetermined period of time.

In step S1105, the control unit 101 performs processing for turning off the screen of the display unit 106.

In step S1106, the display unit 106 turns off the screen.

In step S1107, the control unit 101 determines whether to execute the automatic image transfer function. In this sequence, the automatic image transfer function is set to "disabled", but the control unit 101 recognizes in step S1102 that the smartphone 200 is in a state in which the smartphone 200 cannot receive image data, the control unit 101 therefore determines not to execute automatic image transfer processing.

Because processing in steps S1108 to S1111 is similar to the processing in steps S907 to S910 of FIG. 9, the description will be omitted.

Heretofore, a processing sequence according to the present example embodiment has been described: the processing sequence is to be executed in a case where the camera 100 is set to transfer image data to the smartphone 200, but the smartphone 200 is in a state in which the smartphone 200 cannot receive image data.

<Operation of Camera>

Figure 12:
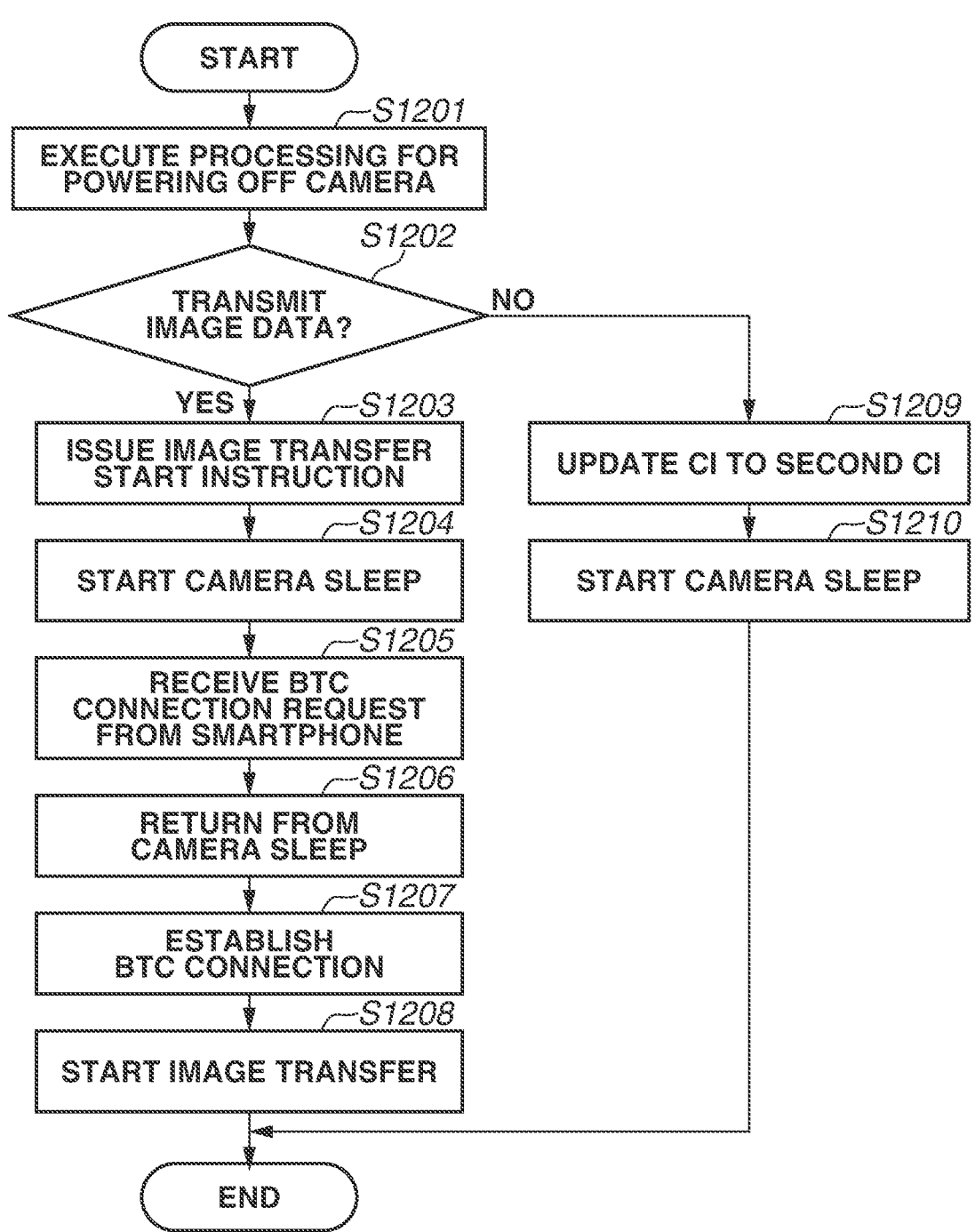
FIG. 12 is a flowchart illustrating processing according to the second example embodiment that is to be executed up to the time when the camera starts to transfer a captured image to the smartphone via Bluetooth® communication.

FIG. 12 is a flowchart illustrating an example of an operation of the camera 100 according to the present example embodiment. The processing is implemented by the control unit 101 executing a program recorded in the non-volatile memory 103.

In step S1201, the control unit 101 executes processing for powering off the camera 100, in response to the user performing a power-off operation via the operation unit 105. For example, the control unit 101 controls the imaging unit 102 to end imaging processing, and controls the display unit 106 to turn off the screen. Instead of executing the processing in response to a power-off operation performed via the operation unit 105, the control unit 101 may execute the processing for powering off the camera 100, in response to the user not operating the camera 100.

In step S1202, the control unit 101 determines whether to transmit image data to the smartphone 200. For example, the control unit 101 determines whether to transmit image data to the smartphone 200, based on whether the automatic image transfer function is enabled, and whether BLE connection with the smartphone 200 has been established. In a case where the automatic image transfer function is enabled and the camera 100 is wirelessly connected with the smartphone 200, the control unit 101 determines to transmit image data to the smartphone 200. In a case where the automatic image transfer function is disabled or the camera 100 is not wirelessly connected with the smartphone 200, the control unit 101 determines not to transmit image data to the smartphone 200.

A case where the control unit 101 determines to transmit image data to the smartphone 200 (YES in step S1202) will now be described.

In step S1203, the control unit 101 transmits a request for starting the transmission of image data, to the smartphone 200 via the first near field communication unit 112a.

In step S1204, the control unit 101 performs control for the camera 100 to shift to the power saving state (sleep state).

In step S1205, the control unit 101 receives a request for establishing BTC connection, from the smartphone 200 via the first near field communication unit 112a.

In step S1206, the control unit 101 controls the camera 100 to shift to a power-on state from the sleep state.

In step S1207, the control unit 101 establishes BTC connection with the smartphone 200 via the second near field communication unit 112b.

In step S1208, the control unit 101 transmits image data to the smartphone 200. In a case where the control unit 101 has transmitted all pieces of image data to be transmitted to the smartphone 200, the control unit 101 controls the camera 100 to shift to the sleep state, and ends the processing of this flowchart.

A case where the control unit 101 determines in step S1202 not to transmit image data to the smartphone 200 (NO in step S1202) will now be described.

In step S1209, the control unit 101 transmits a request for changing the connection interval to the second connection interval, to the smartphone 200 via the first near field communication unit 112a.

In step S1210, the control unit 101 performs control for the camera 100 to shift to the power saving state (sleep state), and ends the processing of this flowchart.

Heretofore, an example of an operation of the camera 100 according to the present example embodiment has been described.

As described above, according to the present example embodiment, the camera 100 maintains the first connection interval in a case where the camera 100 transmits image data to the smartphone 200 in response to a power-off operation on the camera 100. The camera 100 can thereby shorten a time required for starting the transmission of image data, as compared with that in the case of disconnecting BLE connection in response to the power-off operation.

The present invention is not limited to the above-described example embodiments. In implementation, components can be embodied in a modified form without departing from the gist thereof. Various embodiments of the present disclosure can be formed in various configurations by appropriately combining a plurality of components described in the above-described example embodiments. For example, some components may be deleted from all the components described in the example embodiments. Furthermore, components described in different example embodiments may be appropriately combined.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-084668, filed May 19, 2021, which is hereby incorporated by reference herein in its entirety.

What is claimed is:

1. A communication apparatus comprising:
a generation unit configured to generate data in a first state;
a communication unit configured to wirelessly communicate with an external apparatus at a first time interval;
a transmission unit configured to transmit, to the external apparatus, the data generated by the generation unit in response to a transition to a second state in which power consumption is smaller than power consumption in the first state; and a control unit configured to control whether the transmission unit transmits the data in the second state, wherein, in a case where the control unit controls the transmission unit not to transmit the data in the second state, the communication unit wirelessly communicates with the external apparatus, by transmitting an advertising packet in the second state at a second time interval, the second time interval being larger than the first time interval, and wherein, in a case where the control unit controls the transmission unit to transmit the data in the second state, the communication unit wirelessly communicates with the external apparatus by transmitting an advertising packet in the second state at a third time interval, the third time interval being smaller than the second time interval, wherein, in a case where wireless communication is to be performed by transmitting an advertising packet at the second time interval in the second state, the communication unit changes a time interval in such a manner that the wireless communication with the external apparatus is performed at the first time interval in response to a transition from the second state to the first state.

2. The communication apparatus according to claim 1, wherein the communication unit and the transmission unit perform communication in compliance with communication standards different from each other.

3. The communication apparatus according to claim 1, wherein the control unit controls a state of the communication apparatus to shift from the first state to the second state, in response to the communication apparatus being not operated for a predetermined period of time, or in response to an operation to shift the state from the first state to the second state.

4. The communication apparatus according to claim 1, wherein in a case where the transmission unit transmits the data in the second state, the communication unit transmits a request for the transmission unit to start transmission of the data, to the external apparatus in response to a transition from the first state to the second state.

5. The communication apparatus according to claim 1, wherein the communication unit performs synchronous communication with the external apparatus in the first state, and wirelessly communicates with the external apparatus using a beacon signal in the second state.

6. The communication apparatus according to claim 1, wherein the communication unit performs synchronous communication with the external apparatus in the first state and the second state.

7. The communication apparatus according to claim 1, wherein, in a case where wireless connection with the external apparatus has not been established by the communication unit, or in a case where data indicating that the data is unreceivable has been received from the external apparatus, the control unit determines that the transmission unit is not to transmit the data.

8. The communication apparatus according to claim 1, wherein the transmission unit transmits the data to the external apparatus in the first state.

9. The communication apparatus according to claim 1, wherein the data is image data.

10. The communication apparatus according to claim 1, wherein the communication unit communicates with the external apparatus through Bluetooth® Low Energy (BLE) communication, and the transmission unit transmits the data through Bluetooth® Classic (BTC) communication.

11. A control method of a communication apparatus, the control method comprising:

generating data in a first state;

communicating wirelessly with an external apparatus at a first time interval;

transmitting, to the external apparatus, the data generated in the generating in response to a transition to a second state in which power consumption is smaller than power consumption in the first state; and controlling whether data generated in the generating is to be transmitted in the transmitting in the second state, wherein, in a case where the controlling controls the data not to be transmitted in the second state, the communicating includes wirelessly communicating with the external apparatus, by transmitting an advertising packet in the second state, at a second time interval, the second time interval being larger than the first time interval, and wherein, in a case where the controlling controls the data to be transmitted in the second state, the communicating includes wirelessly communicating with the external apparatus by transmitting an advertising packet, in the second state at a third time interval, the third time interval being smaller than the second time interval, wherein, in a case where wireless communication is to be performed by transmitting an advertising packet at the second time interval in the second state, the communication unit changes a time interval in such a manner that the wireless communication with the external apparatus is performed at the first time interval in response to a transition from the second state to the first state.

12. A non-transitory computer-readable storage medium which stores a program for causing a computer to execute a method, the method comprising:

generating data in a first state;

communicating wirelessly with an external apparatus at a first time interval;

transmitting, to the external apparatus, the data generated in the generating, in response to a transition to a second state in which power consumption is smaller than power consumption in the first state; and controlling whether data generated in the generating is to be transmitted in the transmitting in the second state, wherein, in a case where the controlling controls the data not to be transmitted in the second state, the communicating includes wirelessly communicating with the external apparatus, by transmitting an advertising packet in the second state at a second time interval, the second time interval being larger than the first time interval, and wherein, in a case where the controlling controls the data to be transmitted in the second state, in the communicating includes wirelessly communicating with the external apparatus by transmitting an advertising packet, in the second state at a third time interval, the third time interval being smaller than the second time interval, wherein, in a case where wireless communication is to be performed by transmitting an advertising packet at the second time interval in the second state, the communication unit changes a time interval in such a manner that the wireless communication with the external apparatus is performed at the first time interval in response to a transition from the second state to the first state.

* * * * *